(12) United States Patent
Cai et al.

(10) Patent No.: US 10,809,090 B2
(45) Date of Patent: Oct. 20, 2020

(54) ELECTRONIC MAP DISPLAY METHOD AND APPARATUS

(71) Applicant: Alibaba Group Holding Limited, George Town (KY)

(72) Inventors: Lijuan Cai, Hangzhou (CN); Xin Liu, Beijing (CN)

(73) Assignee: Alibaba Group Holding Limited (KY)

( * ) Notice: Subject to any disclaimer, the term of this patent is extended or adjusted under 35 U.S.C. 154(b) by 196 days.

(21) Appl. No.: 16/004,147

(22) Filed: Jun. 8, 2018

(65) Prior Publication Data

US 2018/0348000 A1 Dec. 6, 2018

Related U.S. Application Data

(63) Continuation-in-part of application No. PCT/CN2016/107823, filed on Nov. 30, 2016.

(30) Foreign Application Priority Data

Dec. 10, 2015 (CN) .......................... 2015 1 0917545

(51) Int. Cl.
*G01C 21/36* (2006.01)
*G08G 1/14* (2006.01)
(Continued)

(52) U.S. Cl.
CPC ....... *G01C 21/367* (2013.01); *G01C 21/3641* (2013.01); *G01C 21/3676* (2013.01);
(Continued)

(58) Field of Classification Search
CPC ........ G01C 21/00; G01C 21/20; G01C 21/26; G01C 21/36; G01C 21/3641; G01C 21/3676; G08G 1/00; G08G 1/0129; G08G 1/0141; G08G 1/0962; G08G 1/09626; G08G 1/143; G07C 5/00
See application file for complete search history.

(56) References Cited

U.S. PATENT DOCUMENTS 5,848,373 A * 12/1998 DeLorme ............... G01C 21/20
701/455
6,812,942 B2 11/2004 Ribak
(Continued)

FOREIGN PATENT DOCUMENTS

| CN | 101387521 A | 3/2009 |
|---|---|---|
| CN | 101451852 A | 6/2009 |
| CN | 101532843 A | 9/2009 |
| WO | 2015006178 A1 | 1/2015 |

*Primary Examiner* — Yonel Beaulieu
(74) *Attorney, Agent, or Firm* — Van Pelt, Yi & James LLP

(57) ABSTRACT

Embodiments of the present application disclose an electronic map display method, device, and system. The method includes obtaining, by one or more processors, current driving information, historical driving information, or both, wherein the current driving information, historical driving information, or both are obtained from one or more of a network-side server and a control system of a vehicle, determining, by the one or more processors, display information based at least in part on the current driving information, the historical driving information, or both, and providing, by the one or more processors, an electronic map based at least in part on the display information.

23 Claims, 4 Drawing Sheets

(51) Int. Cl.
  *G08G 1/16*      (2006.01)
  *G07C 5/00*      (2006.01)
  *G08G 1/01*      (2006.01)
  *G08G 1/0962*    (2006.01)
  *G08G 1/0967*    (2006.01)
  *G06F 16/29*     (2019.01)
  *G07C 5/08*      (2006.01)

(52) U.S. Cl.
  CPC ......... *G08G 1/0112* (2013.01); *G08G 1/0129* (2013.01); *G08G 1/0141* (2013.01); *G08G 1/0962* (2013.01); *G08G 1/09626* (2013.01); *G08G 1/096716* (2013.01); *G08G 1/096741* (2013.01); *G08G 1/096775* (2013.01); *G08G 1/143* (2013.01); *G01C 21/3658* (2013.01); *G01C 21/3679* (2013.01); *G01C 21/3697* (2013.01); *G06F 16/29* (2019.01); *G07C 5/008* (2013.01); *G07C 5/0841* (2013.01)

(56) References Cited

U.S. PATENT DOCUMENTS

| | | | |
|---|---|---|---|
| 9,818,088 B2 | 11/2017 | Penilla | |
| 9,855,947 B1 | 1/2018 | Penilla | |
| 2003/0182052 A1* | 9/2003 | DeLorme | G01C 21/26 701/533 |
| 2004/0092253 A1 | 5/2004 | Simonds | |
| 2004/0093154 A1 | 5/2004 | Simonds | |
| 2004/0093155 A1 | 5/2004 | Simonds | |
| 2006/0220923 A1 | 10/2006 | Tanizaki | |
| 2007/0032949 A1* | 2/2007 | Arai | G01C 21/00 701/420 |
| 2010/0094496 A1* | 4/2010 | Hershkovitz | B60L 3/12 701/22 |
| 2014/0063064 A1 | 3/2014 | Seo | |
| 2014/0114574 A1* | 4/2014 | Tertoolen | G01C 21/367 701/533 |
| 2016/0019786 A1 | 1/2016 | Yoon | |
| 2018/0210210 A1 | 7/2018 | Yamamura | |

* cited by examiner

300

ELECTRONIC MAP DISPLAY METHOD AND APPARATUS

CROSS REFERENCE TO OTHER APPLICATIONS

This application is a continuation-in-part of and claims priority to International (PCT) Application No. PCT/CN16/107823 entitled ELECTRONIC MAP DISPLAY METHOD AND APPARATUS, filed Nov. 30, 2016 which is incorporated herein by reference for all purposes, which claims priority to China Application No. 201510917545.3 entitled AN ELECTRONIC MAP DISPLAY METHOD AND MEANS, filed Dec. 10, 2015 which is incorporated herein by reference for all purposes.

FIELD OF THE INVENTION

The present application relates to a field of communication technology. In particular, the present application relates to a method, system, and device for displaying an electronic map.

BACKGROUND OF THE INVENTION

An electronic map (e.g., a digital map) is a computer technology-based map that can be digitally stored and consulted. The electronic map can be used in connection with obtaining navigation information, etc. Information associated with an electronic map is generally stored using a vector image storage. The use of vector image storage comprises storing a formula that can be used to regenerate the image corresponding to the vector image storage. The electronic map can be displayed on the screen of an electronic device. Generally, the scale of an electronic map can be increased or decreased, and the map can be rotated.

Electronic maps are currently used in the following contexts: searching for places and locations, searching for trip routes via a map (e.g., public transportation routes to a destination, driving routes to a destination, walking routes to a destination, etc.), learning other information about a place of interest (e.g., a map displays information other than geographic location such as, for example, telephone numbers and other contact information in connection with providing the user with detailed information relating to a location such as products and services provided by a company or a merchant), and providing information on maps (e.g., an electronic map is a public platform whereby an enterprise, for example, can publish advertisements).

The use of electronic maps is becoming more prevalent with the increased use of smart phones and vehicle-mounted terminals. Therefore, a method, device, terminal, and system for providing a display of effective information in connection with display of a map is desired.

BRIEF DESCRIPTION OF THE DRAWINGS

Various embodiments of the invention are disclosed in the following detailed description and the accompanying drawings.

DETAILED DESCRIPTION

Figure 1:
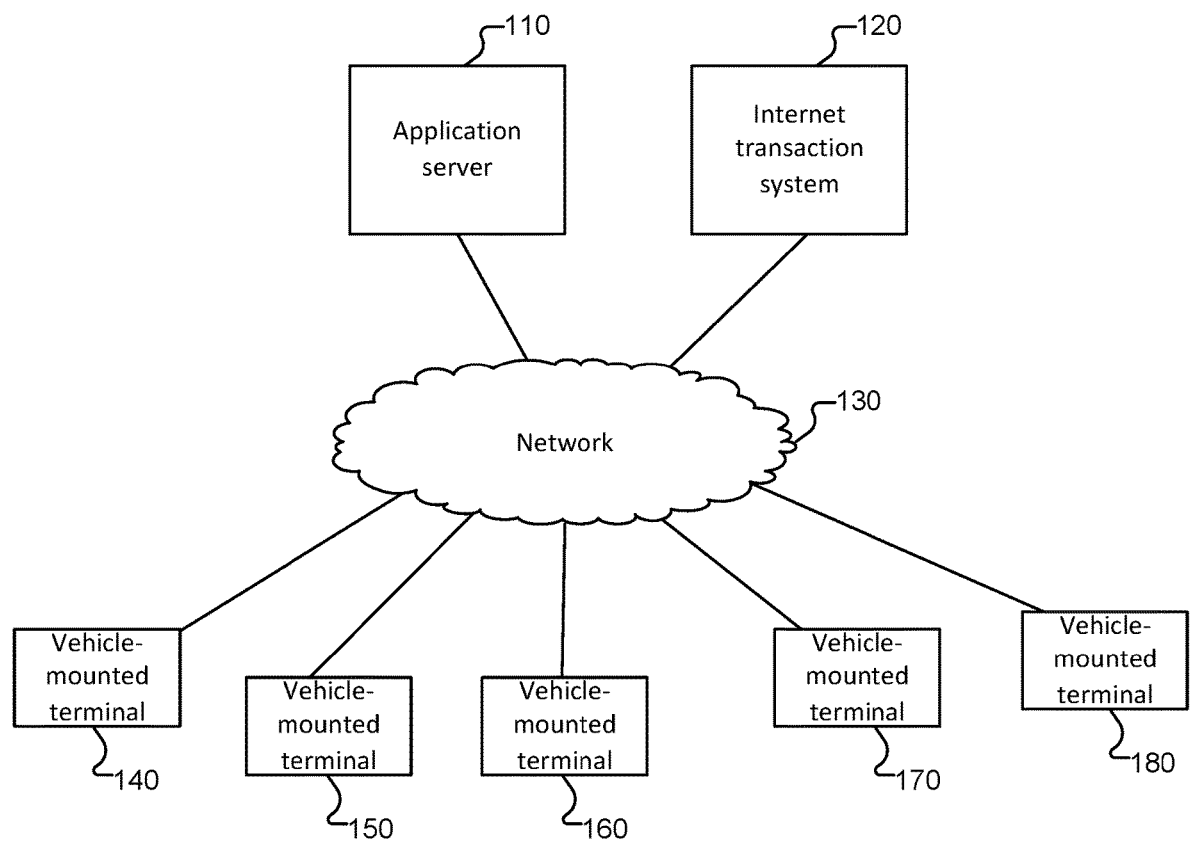
FIG. 1 is a diagram of a system according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, an information centers (such as one or more services providing information such as traffic or weather, etc.) a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS, Windows, can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

According to various embodiments, a terminal is incorporated in or otherwise connected to a vehicle such as a car, a truck, etc. The terminal can be mounted to the vehicle and can provide various navigation functions.

Vehicle-mounted terminals implement electronic map-related functions, such as navigation functions. Vehicle-mounted terminals can be correspond to terminals that are connected to the computer system of the terminal. In some embodiments, a smartphone implements electronic-map functions. For example, terminals are configured to provide driving route navigation to destinations for users and provide guidance on electronic maps. The terminal is configured to obtain the destination and compute a navigation (e.g., the driving route navigation) to the destination from another location (e.g., a current location of the user or a location selected by the user). The terminal can obtain the destination via an input from a user (e.g., using a user interface of the terminal), via a communication from another terminal (e.g., from a user's smart terminal such as via a Bluetooth connection), via communication from a server (e.g., from a server that provides a service such as a calendar or scheduling service to a user), or other appropriate techniques.

According to various embodiments, an electronic map being provided can be adjusted or modified. For example, a manner in which the electronic map is being provided (e.g., displayed to the user) can be adjusted. The manner in which the electronic map is provided is adjusted based at least in part on a user input, user settings, and/or user preferences. A user can input control (e.g., one or more commands) to an electronic map (or an application that is providing the electronic map) via one or more screen operations. For example, the terminal includes a touchscreen and a user can input one or more inputs to the touchscreen. The terminal can change electronic map scales and enlarge or shrink electronic map display effects, etc. based on the user input, user settings, and/or user preferences. Electronic maps are often used in connection with travel and thus the risks of driving are increased if a user performs a screen operation directed at an electronic map display while driving.

According to the related art, information that is unrelated, ineffective, and/or undesired by the user is often provided on the electronic map. Such information provided on the map is likely to distract the vehicle driver, thus making the use of electronic maps according to conventional implementations risky to use while driving or otherwise operating a vehicle. Information that is unrelated, ineffective, and/or undesired by the user is often provided on the electronic map can be determined on a context-by-context basis. For example, the information that is deemed to be unrelated, ineffective, and/or undesired by the user can be determined according to a context of the user, the terminal, and/or the vehicle. Information that is unrelated, ineffective, and/or undesired by the user can include road identifies or road names for roads that are not along the route, or that are deemed secondary roads or routes. Information that is unrelated, ineffective, and/or undesired by the user can include identifiers of landmarks or businesses that are not along the current route, identifiers of landmarks or businesses that are within the geographic area corresponding to the electronic map (or at least the portion of the electronic map that is displayed), etc. Information that is unrelated, ineffective, and/or undesired by the user can include identifiers corresponding to traffic, accidents, law enforcement presence, etc. that is not along the current route.

Various embodiments provide a system, device, and method for automatically adjusting electronic map displays. For example, the electronic map (or application providing the electronic map) is adjusted without user input. The electronic map can be adjusted based on information that is different from a user input specifically requesting adjustment of the electronic map. In some embodiments, the display of the electronic map can be adjusted in accordance with the operating (e.g., driving) conditions of a transportation system (e.g., the transportation system that is currently being used by the user to which the electronic map is being provided). The transportation system includes, but is not limited to, land vehicles (e.g., a car, a truck, a motorcycle, a bicycle, etc.), water craft (e.g., a boat, a jet ski, etc.), etc.

In some embodiments, an electronic map display is provided. This electronic map display could be an electronic device (such as a vehicle-mounted terminal) or an application installed on an electronic device. The electronic map display can run an application that provides the electronic map, and/or that adjusts the display of the electronic map. The electronic map display can receive information associated with a context of the vehicle (e.g., one or more operating conditions of the vehicle being operated), and adjust the display of the electronic map based at least in part on such information.

In some embodiments, the electronic map display corresponds to an electronic peripheral device. The electronic peripheral device can be a terminal. The electronic peripheral device includes a communication interface configured to communicate (e.g., exchange) information with a control system of a transportation system. For example, the electronic peripheral device can be connected to the control system of the transportation system (e.g., the vehicle). The electronic peripheral device obtains driving information from the control system. In some embodiments, the electronic map is dynamically adjusted based at least in part on the driving information (e.g., obtained from the control system of the vehicle). For example, the electronic map is dynamically adjusted in response to the obtaining of the driving information. The electronic peripheral device dynamically adjusts the display of the electronic map based on the obtained driving information. In some embodiments, the electronic peripheral device is connected with a network server. The electronic peripheral device can connect to the network server via a wireless connection. For example, the electronic peripheral device is configured with a wireless communication interface that exchanges information with a network server.

In some embodiments, the electronic map display corresponds to a component or module built into (e.g., integrated with, installed on, closely connected to, etc.) the control system of a transportation system. The component or module corresponding to the electronic map display exchanges information with the control of a transportation system. The component or module corresponding to the electronic map display obtains driving information (e.g., from the control system of the transportation system). In some embodiments, the electronic map is dynamically adjusted based at least in part on the driving information (e.g., obtained from the control system of the vehicle). For example, the electronic map is dynamically adjusted in response to the obtaining of the driving information. The component or module corresponding to the electronic map display dynamically adjusts the display of the electronic map based on the obtained driving information.

In some embodiments, the electronic map display corresponds to an application. The application (e.g., corresponding to the electronic map display) can be installed in a control system electronic device (e.g., a vehicle-mounted terminal) of a transportation system. The application can communicate (e.g., exchange) information with the control system of the transportation system. The application obtains driving information from the control system. In some embodiments, the electronic map is dynamically adjusted based at least in part on the driving information (e.g., obtained from the control system of the vehicle). For example, the electronic map is dynamically adjusted in response to the application obtaining the driving information. The application dynamically adjusts the display of the electronic map based on the obtained driving information. In some embodiments, the application displayed by the electronic map display is installed on a mobile terminal such as a mobile phone. As an example, the mobile terminal obtains the driving information. The mobile terminal (e.g., on which the application is installed) can obtain the driving information based on communication (e.g., exchange) information with the control system of the transportation system. In response to obtaining the driving information, the mobile terminal dynamically adjusts the electronic map. The mobile terminal can provide the electronic map based on the dynamic adjustment of the electronic map. For example, the mobile terminal displays on the screen of the mobile terminal based on the obtained driving information. As another example, the mobile terminal communicates information (e.g., pertaining to one or more adjustments to the electronic map based on the driving information) to the control system of the transportation system (or another module connected to the transportation system) and the electronic map is provided by the control system.

The following embodiments of the present application are described in detail using the example of dynamic adjustment of the electronic map display via a vehicle-mounted terminal. The concept of dynamically adjusting the electronic map can be extended to other implementations (e.g., to a mobile device running an application, etc.). The concept of dynamically adjusting the electronic map can be extended to other schemes for dynamically adjusting the electronic map display based on driving information.

FIG. 1 is a diagram of a system according to various embodiments of the present disclosure.

Referring to FIG. 1, system 100 is provided. System 100 can implement at least a part of process 200 of FIG. 2. System 100 can be implemented at least in part by device 300 of FIG. 3, and/or computer system 400 of FIG. 4.

As shown in FIG. 1, system 100 comprises an application server 110 and one or more vehicle-mounted terminals (e.g., vehicle mounted terminals 140-180). The application server 110 can correspond to a network-side application server. For example, the application server 110 can provide one or more servers to the one or more vehicle-mounted terminals. The one or more vehicle-mounted terminals and the application server 110 communicate via a network 130. The application server 110 can also communicate with other business service systems. For example, system 100 can further include an Internet transaction system 120. The application server 110 and the Internet transaction system 120 can communicate via the network 130. The Internet transaction system 120 can store transaction information. The Internet transaction system 120 can communicate transaction information with the application server 110.

The application server 110 is configured to obtain and store driving information reported by the one or more vehicle-mounted terminals 140-180. The application server 110 is configured to store historical driving information. As an example, the historical driving information is associated with a user. As another example, the historical driving information is associated with a particular vehicle. In some embodiments, the application server 110 (or a database connected thereto) stores mappings of historical driving information to users, and/or mappings of historical driving information to vehicles (or transportation systems). In some embodiments, the application server 110 (or a database connected thereto) stores mappings of historical driving information to locations (e.g., to one or more predefined geographical areas). The application server 110 is configured to communicate stored historical driving information to a vehicle-mounted terminal based on requests for driving information by the vehicle-mounted terminal. For example, the one or more mounted terminals 140-180 send one or more requests for driving information to application server 110. The one or more mounted terminals 140-180 are configured to query application server 110 for driving information (e.g., historical driving information). The one or more requests for driving information are configured to comprise an identifier associated with a user, an identifier associated with a vehicle, coordinates of a current location, etc. In some embodiments, application server 110 determines corresponding driving information to send to the one or more mounted terminals 140-180. For example, application server 110 is configured to anticipate a driving route of a vehicle-mounted terminal based on driving information from the vehicle-mounted terminal. Application server 110 is configured to determine driving information (e.g., anticipated driving information) to send to the one or more vehicle-mounted terminals 140-180 based on driving information that application server 110 receives from one or more vehicle-mounted terminals 140-180. Accordingly, application server 110 is configured to send the driving information to the one or more vehicle-mounted terminals 140-180 without receiving a specific request (e.g., from the one or more vehicle-mounted terminals 140-180) for such driving information.

According to various embodiments, the one or more vehicle-mounted terminals 140-180 obtain driving information from a vehicle control system and/or from the application server 110. In some embodiments, the electronic map is dynamically adjusted (e.g., modified) based at least in part on the obtained driving information. In some embodiments, display of the electronic map is dynamically adjusted based on the obtained driving information. Dynamic adjusting of the electronic map or the display thereof can be performed by at least one of the one or more vehicle-mounted terminals 140-180, a control system for the vehicle, etc. In some embodiments, a vehicle-mounted terminal (e.g., one or more vehicle-mounted terminals 140-180) obtains transaction information. The transaction information can be obtained from application server 110 (e.g., via network 130). The transaction information can be used as a basis to dynamically adjust the electronic map and/or a display of the electronic map. In some embodiments, the electronic map is dynamically adjusted (e.g., modified) based at least in part on the obtained driving information and the transaction information. The transaction information can correspond to a transaction that is associated with the user, a service that the user has obtained (e.g., within a predefined threshold time, within a predefined threshold distance, etc.), etc.

The one or more vehicle-mounted terminals 140-180 and the application server 110 can exchange information via a network 130. The network 130 can be a wide area network, a local area network, or the Internet. The one or more vehicle-mounted terminals 140-180 can communicate with network 130 via mobile communication technology, etc. In some embodiments, the one or more vehicle-mounted terminals 140-180 connect to the network 130 via a cellular communication tower, a wireless router, etc. The terminal may wirelessly access the Internet. The application server 110 generally is connected to the Internet via cables. For example, the application server 110 can be a cloud server.

In some embodiments, the application server 110 employs cloud computing technology and implements information processing (e.g., anticipating vehicle-mounted terminal driving routes) using powerful functions based on cloud computing technology. The application server 110 and the one or more vehicle-mounted terminals 140-180 can employ a cloud computing technology-based operating system such as YunOS and thus integrate cloud and terminal resources and services.

Figure 2:
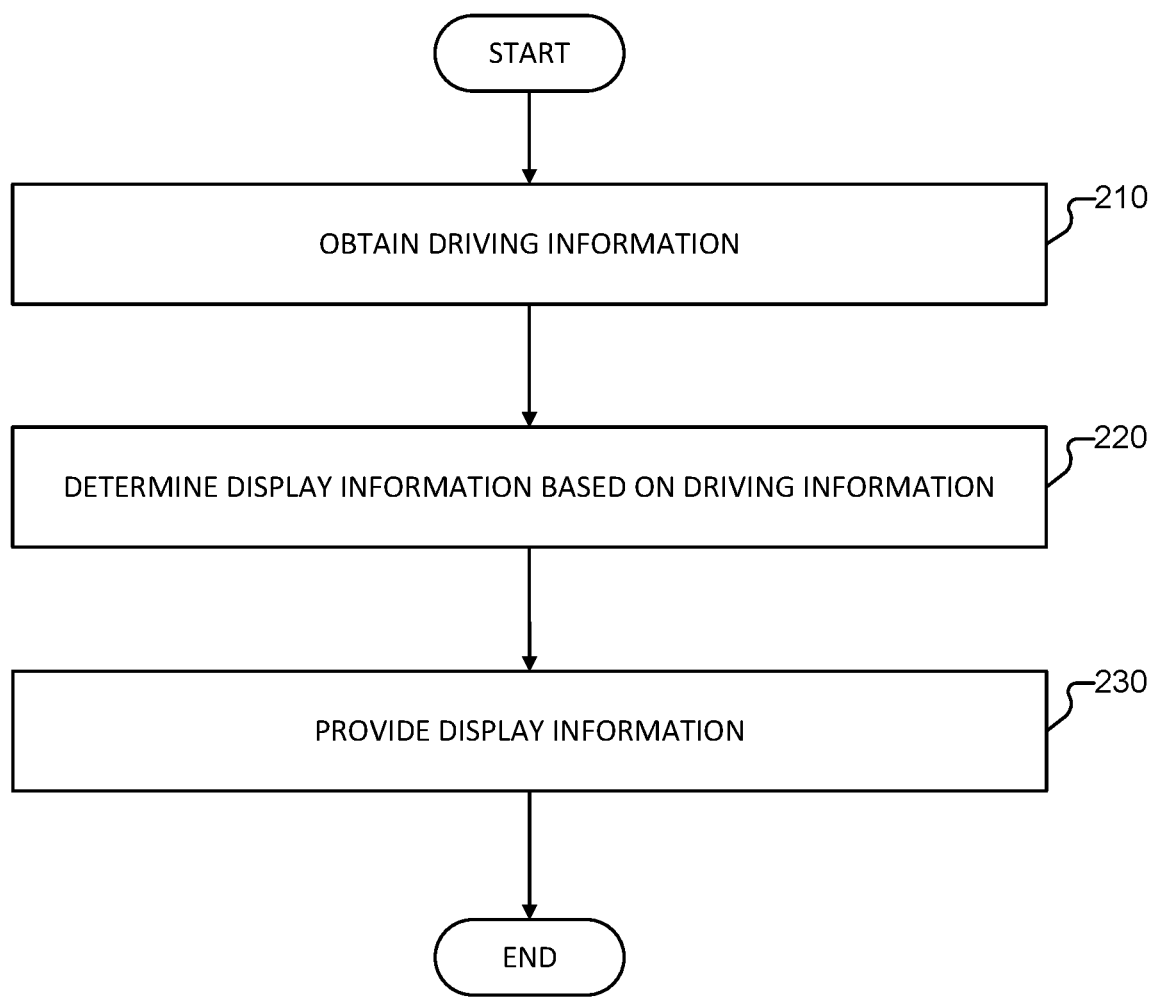
FIG. 2 is a flowchart of a method for providing an electronic map according to various embodiments of the present disclosure.

FIG. 2 is a flowchart of a method for providing an electronic map according to various embodiments of the present disclosure.

Referring to FIG. 2, process 200 for providing an electronic map is provided. Process 200 can be implemented at least in part by system 100 of FIG. 1, device 300 of FIG. 3, and/or computer system 400 of FIG. 4.

At 210, driving information is obtained. The driving information can comprise current driving information and/or historical driving information. In some embodiments, a terminal obtains the driving information. For example, a terminal is configured to obtain current driving information and/or historical driving information from storage, a server, etc. The terminal can obtain the driving information from a server via one or more networks. The terminal can be a vehicle-mounted terminal, a mobile terminal, etc. In some embodiments, the terminal is associated with a user. In some embodiments, the terminal is associated with a particular vehicle.

According to various embodiments, a server can store mappings of terminals to users, mappings of terminals to vehicles, etc. The mappings of terminals to users can comprise a mapping of an identifier associated with a terminal (e.g., a media access control (MAC) address, an internet protocol (IP) address, a unique device identifier (UDI), etc.) to an identifier associated with a user (e.g., a user ID, a user name, etc.). The mappings of terminals to vehicles can comprise a mapping of an identifier associated with a terminal (e.g., a media access control (MAC) address, an internet protocol (IP) address, a unique device identifier (UDI), etc.) to an identifier associated with a vehicle (e.g., a vehicle identification number (VIN), a license plate, a media access control (MAC) address, a unique device identifier (UDI), etc.). In response to receiving a request for driving information, the server can query the mappings of terminals to users or mappings of terminals to vehicles to identify information responsive to the request for driving information. For example, the request for driving information comprises an identifier associated with the terminal (e.g., the vehicle-mounted terminal, a mobile terminal, etc.). The terminal can send the request for driving information based on a context of the terminal (or the vehicle, etc.), in response to an input from a user, at predefined intervals, etc. In some embodiments, the request for driving information comprises location information associated with the terminal, user preferences and/or settings, etc. In response to receiving the request for driving information, the server determines driving information to communicate to the terminal. For example, the server determines the driving information based on the request for driving information (e.g., based on a terminal identifier comprised in the request for driving information, based on context information comprised in the request for driving information, etc.).

As an example, the driving information can be stored locally at a vehicle associated with the vehicle-mounted terminal (e.g., the vehicle to which the vehicle-mounted terminal is mounted). As another example, the driving information is stored remotely at a server or at a database associated with a server. In some embodiments, a first part of the driving information is stored locally at the vehicle and a second part of the driving information is stored remotely at a server. For example, current driving information is stored locally at the terminal (e.g., on a storage device associated with the terminal, as inputs from one or more sensors associated with the vehicle, etc.), and historical driving information is stored remotely at one or more servers.

In some embodiments, the vehicle-mounted terminal communicates with the control system of the vehicle in which the vehicle-mounted terminal is mounted. A vehicle can be equipped with one or more sensors (or a plurality of sensors). For example, the one or more sensors with which the vehicle is equipped comprise a transmission or suspension-mounted sensor configured to measure vehicle speed, a turn signal cable-mounted sensor configured to detect whether a turn signal is on or off, a turn signal sensor configured to detect a direction of a turn signal turned on (e.g., left or right), a position sensor configured to detect a current position (e.g., a GPS, etc.), etc. The control system of the vehicle can obtain information from the one or more sensors. For example, the control system obtains data measured by the one or more sensors. As an example, the one or more sensors communicate the data measured by the one or more sensors in response to the one or more sensors collecting (e.g., detecting) the corresponding information (or input). As an example, the one or more sensors communicate the data measured by the one or more sensors based on a predefined period. The data measured by the one or more sensors can be transmitted via data cables or via wireless connections to the vehicle control system. Accordingly, the control system obtains the current driving information for the vehicle. In some embodiments, the vehicle control system can be linked to a Controller Area Network (CAN) bus of the vehicle and the vehicle control system can thereby obtain vehicle driving data in real time (e.g., obtain the driving status of the vehicle in real time). Obtaining the driving data in real time can comprise obtaining driving data from the CAN of the vehicle as the one or more sensors provide the corresponding information to the CAN.

The control system (e.g., the vehicle control system) can store the driving information. For example, in response to obtaining the driving information, the control system stores the driving information locally, or stores the driving information remotely. The control system can upload the driving information to a network-side application server. In response to receiving the driving information from the terminal or the control system, a server stores the driving information. For example, the server stores the driving information in association with the terminal (e.g., in connection with a mapping of driving information to terminals such as based on a terminal identifier). As another example, the server stores the driving information in association with a user such as a user associated with the vehicle or the terminal (e.g., in connection with a mapping of driving information to users).

In some embodiments, the terminal (e.g., the vehicle-mounted terminal) obtains driving information from the network-side application server or from the local control system. The terminal can obtain driving information by combining both approaches—obtaining driving information from the local control system and from remote storage such as via the application server. The terminal (e.g., a vehicle-mounted terminal) can obtain the current driving information for the vehicle. For example, the terminal can obtain the current driving information from the vehicle control system. In some embodiments, the terminal can obtain driving information from the application server or the local control system based on a priority associated with obtaining the driving information from the application and/or a priority associated with obtaining the driving information from the local control system. For example, in connection with conserving network resources, the vehicle-mounted terminal can give priority to obtaining the driving information (e.g., the historical driving information) from the local control system. The terminal can determine whether the driving information (e.g., the historical driving information) is stored locally, and obtain the driving information from local storage if such driving information is stored locally, and otherwise obtain the driving information from remote storage if such driving information is not stored locally. For example, if historical driving information has not been saved locally (e.g., after the vehicle-mounted terminal is powered on), the historical driving information can be acquired from a network server (e.g., from the application server).

In some embodiments, the vehicle control system obtains driving information (e.g., historical driving information) in response to a route being determined, or in response to a selection of a destination. Accordingly, the vehicle control system can obtain the driving information before a trip or at the beginning of a trip such that the driving information is available from local storage (e.g., to be used in connection with a dynamic update or adjustment of the electronic map).

In some embodiments, the terminal obtains the driving information periodically. For example, the terminal obtains the driving information according to a predefined interval.

At 220, display information is determined based on driving information. In some embodiments, the display information is associated with an electronic map. For example, the display information comprises electronic map display content and/or electronic map display effects. The electronic map display content and/or electronic map display effects are determined based on the driving information. In some embodiments, the electronic map display content and/or electronic map display effects are determined by the terminal (e.g., the vehicle-mounted terminal, a mobile terminal, etc.). In some embodiments, the electronic map display content and/or electronic map display effects are determined by one or more servers (e.g., the application server). For example, the application server provides a service of remotely processing (e.g., determining) the electronic map display content and/or electronic map display effects. In some embodiments, a first part of the electronic map display content and/or electronic map display effects is determined locally (e.g., by the terminal and/or by a control system of the vehicle), and a second part of the electronic map display content and/or electronic map display effects is determined remotely (e.g., by the application server). If the application server determines at least a part of the electronic map display content and/or electronic map display effects, the application server provides (e.g., communicates) the at least the part of the electronic map display content and/or electronic map display effects to the terminal or the vehicle (e.g., the control system of the vehicle).

According to various embodiments, different implementations for displaying an electronic map can be predefined. An implementation for displaying an electronic map can correspond to a configuration for displaying an electronic map. For example, a configuration for displaying an electronic map can include predefined content or information (e.g., a type of information to be displayed, a manner in which information associated with an electronic map is displayed, a display effect associated with a display of the electronic map, etc.). A configuration for displaying an electronic map can be associated with a driving status. For example, a mapping of configurations for displaying an electronic map to driving statuses can be stored. The mapping of configurations for displaying an electronic map to driving statuses can be stored locally (e.g., at the terminal, at the vehicle, etc.), or remotely (e.g., on an application server or a storage associated with the application server). Accordingly, different electronic map display strategies can be set for different driving statuses. The terminal (e.g., vehicle-mounted terminal) can thus determine electronic map display content and/or display effects based on acquired driving information and corresponding electronic map display strategies (e.g., configurations for displaying the electronic map).

According to various embodiments, determining the display information comprises determining the configuration for displaying the electronic map or determining a corresponding electronic map display embodiment. For example, the terminal determines the configuration for displaying the electronic map (e.g., the corresponding electronic map display embodiment) based on a context of the terminal, the user, and/or the vehicle. The terminal can determine a driving status associated with the terminal, the user, and/or the vehicle, and based on the driving status, the terminal can determine the configuration for displaying the electronic map. The configuration for displaying the electronic map can be used in connection with determining the display information.

According to various embodiments, in connection with determining electronic map display content based on obtained driving information, the driving information is used as a basis to determine one or more of a category, a level, and/or a quantity of content for display on an electronic map. The category, level, and/or quantity of content for display on the electronic map can be determined by the terminal, the control system of the vehicle, and/or the server. As an example, a category includes a type of road (e.g., a primary road, a highway, a street road, a gravel road, a 2-lane highway, a four-lane highway), information pertaining to a landmark, information pertaining to a neighborhood, information pertaining to businesses, information pertaining to railroads, information pertaining to speed limits, etc. As an example, a level includes a priority level, a level of a road (e.g., a distinction as to whether the road is a primary road, a highway, a street road, a gravel road, a 2-lane highway, a four-lane highway, etc.), a level of a route (e.g., a primary route such as a fastest, most efficient, shortest, route with no tolls, etc.), etc. As an example, a quantity of content includes a measure of a geographic area (e.g., a predefined number of square miles, etc.), a measure of a number of roads, a measure of a number of business information to be displayed (e.g., along the route), etc.

The electronic map display content can include, but is not limited to, one or more of the following content: points of interests (POIs) on the electronic map, road names, road status (e.g., congestion status, flooding status, closed status, open status, and traffic accident status), weather conditions, topography, etc. As an example, a POI can correspond to one or more of four types of information: a name, a category, a longitude and latitude, and information on nearby businesses or places to visit (e.g., hotels, shops, parks, national parks, landmarks, monuments, restaurants, gas stations, recharge stations, rest stops, visitor centers, etc.). In some embodiments, the information on nearby businesses or places to visit is determined based at least in part on a user profile, user setting, and/or user preferences of a user associated with the terminal or the vehicle. For example, the information comprised in the electronic map display content can comprise a location of an individual or business in a contact directory of a user's profile (e.g., a contact included in a contacts application on the user's terminal, a contact associated with a user profile stored at the application server, etc.). The electronic map display content can include warning or alert information, such as parking violation alerts, excess speed warnings, weather alerts (e.g., tornadoes, severe weather alerts, snow storm alerts, emergency disaster alerts, etc.), etc. In some embodiments, a display of an electronic map comprises displaying an electronic map interface. The electronic map interface can include one or more function buttons. As an example, the function buttons can be displayed in a menu box, a menu window, as an element overlaid (e.g., floating) in relation to the electronic map, etc. In some embodiments, the one or more function buttons are determined based at least in part on the driving information. The one or more function buttons can be determined based at least in part on a context of the vehicle, the terminal, and/or the user. For example, the one or more function buttons are determined based at least in part on a driving status. Function buttons can correspond to an element that is displayed on an interface and that launches a command, process, or function in response to selection thereof. For example, in response to a user making a selection (e.g., inputting a touch input to a corresponding area of a touch screen of the terminal or a display of the vehicle), a corresponding command, process, or function is performed. The providing (e.g., display) of the function buttons on the electronic map (or in connection with the electronic map) can be based at least in part on the driving information. For example, when the vehicle is traveling at a relatively high speed (e.g., at a speed greater than or equal to a predefined speed threshold), a "view nearby service facilities" function button may be hidden. A granularity of information or types of information comprised in the electronic map display content can be determined based at least in part on a speed at which a vehicle is traveling, a current time, user preferences or settings, calendar information for a user (e.g., based on whether a user has an upcoming appointment, meeting, etc.), etc.

According to various embodiments, electronic map display effects include, but are not limited to, one or more of the following kinds of display effects: electronic map scale, POI size, color, line thickness, brightness, transparency, saturation, three-dimensional display effects, and two-dimensional display effects. Various embodiments support tilted or rotated display of the electronic map based on the user's browsing view.

At 230, display information is provided. The terminal (e.g., a user's mobile terminal, the vehicle-mounted terminal, etc.) can provide the display information (e.g., to the user). The providing of the display information can comprise displaying the display information (e.g., the electronic map and/or electronic map display content). The vehicle-mounted terminal displays an electronic map based on the electronic map display content and display effects that were determined. In some embodiments, at least a part of the electronic map display content is provided to the user via an audio output (e.g., an alert communicated via a terminal or vehicle speaker, etc.). For example, the terminal or the application server can determine whether to provide at least a part of the electronic map display content via an audio output based on the driving information. In some embodiments, if the vehicle is traveling at a speed greater than or equal to a predefined speed threshold, the terminal and/or application server determines to provide the user with the at least a part of the electronic map display content via an audio output. As an example, if the vehicle is traveling at a speed greater than or equal to a predefined speed threshold, the terminal can provide an audio output corresponding to an alert associated with a speed limit (e.g., if the vehicle entered into a zone with a new speed limit, if an accident is reported within a predefined threshold distance, etc.). In some embodiments, if the vehicle is traveling in an area with a current corresponding weather alert, the terminal and/or application server determines to provide the user with the at least a part of the electronic map display content via an audio output. As an example, if the vehicle is traveling in an area with a current corresponding weather alert (e.g., severe thunderstorms, flash flooding, a snow storm, etc.), the terminal can provide an audio output corresponding to an alert associated with road conditions (e.g., a road closure, a reported accident such as within a predefined threshold distance, etc.).

According to various embodiments, current and/or historical driving information serves as a basis for determining electronic map display content and for determining display effects and thus for (dynamically) adjusting electronic map display. To provide better display of effective information and improve user experience, the appropriate display content and effects in the current situation can be determined based on current and/or historical driving information and thus dynamically adjust electronic maps based on driving information.

In some embodiments, an anticipated driving route is determined based on obtained driving information. Examples of the determining of the anticipated driving route are provided below. The terminal and/or application server can determine the anticipated driving route based on the driving information. For example, the electronic map content and/or electronic map display effects are determined based on the obtained driving information and an anticipated driving route. In some embodiments, the anticipated driving route is determined based on historical driving information. The historical information can be associated with one or more of the user, the vehicle, other users, other vehicles, etc. For example, the historical driving information comprises past driving information for the user (e.g., based on one or more past trips, etc.). The anticipated driving route can be determined in contexts when navigation functions of the terminal (e.g., the vehicle-mounted terminal) have an off status. Conversely, if the navigation functions of the terminal have an on status, then the driving route corresponds to the navigation route.

In some embodiments, in response to a terminal being turned-on or switched to an active status in connection with a vehicle being on (or just turned on), the terminal obtains the last trip record data and determines the present driving route (e.g., the anticipated driving route) based on the driving route comprised in the last trip record data and on the current location (of the vehicle or terminal). For example, if the last driving route was a route corresponding to "office-to-home" and the current location of the vehicle and/or terminal is at a location corresponding to home, the terminal determines the present driving route (e.g., the anticipated driving route) to correspond to the "home-to-office" driving route. In some embodiments, the anticipated driving route is determined further based on a current time and a time of past trip record data. For example, if past trip record data shows that the user generally travels from home to work in the morning (e.g., 8:00 am), then the anticipated driving route is determined to be from home to work in the morning (e.g., on weekday). The terminal can determine the electronic map display content and/or the electronic map display effects based on the anticipated driving route. For example, the terminal displays information (e.g., the electronic map) such as navigation information pertaining to the anticipated driving route.

According to various embodiments, statistically relevant patterns are identified based on past trip record data. The terminal and/or the application server can determine the statistically relevant patterns. The statistically relevant patterns can comprise travel patterns. In some embodiments, the statistically relevant patterns (e.g., the travel patterns) are used in connection with determining the anticipated driving route.

In some embodiments, if the navigation functions of the terminal have a status set to off while the vehicle is traveling, the terminal can obtain historical driving record data and determine the next route (e.g., the anticipated driving route). The next route can correspond to an intersection, etc. on the currently driven route. The terminal determines the next route (e.g., the anticipated driving route) based on the historical driving record data and one or more other context information such as environment information (e.g., current time). Other environment information can comprise weather, road closures, etc. As an example, if the historical driving data indicates that, nearly every weekday between 12:00 PM and 1:00 PM, a left turn is made at Intersection 01 of Street A onto Street B, and if the current time is 12:30 and the vehicle is traveling on Street A, then the anticipated route is determined to be a left turn from Intersection 01 of Street A onto Street B. The terminal can determine display information (e.g., the electronic map display content and/or the electronic map display effects) based on the anticipated driving route. For example, the terminal displays information (e.g., the electronic map) such as navigation information pertaining to the anticipated driving route.

In some embodiments, anticipated driving route information is obtained. For example, the terminal (e.g., the vehicle-mounted terminal) obtains the anticipated driving route information from an application server. The application server can determine the anticipated driving route based on the historical driving information and provide (e.g., send) the anticipated driving route information to the terminal. As an example, the application server provides the anticipated driving route information at predefined times. As another example, the application server provides the anticipated driving route information in response to a request for the anticipated driving route information from the terminal. As another example, the application server provides the anticipated driving route information in response to receiving an indication that the terminal is turned on in connection with the vehicle (e.g., if the terminal corresponds to a vehicle-mounted terminal, then when the terminal is turned on, or if the terminal is a mobile terminal, then when the terminal has an on status and is connected to the vehicle such as via Bluetooth, or when the terminal has an on status and the terminal and the vehicle are turned on, etc.).

Referring to FIG. 2, at 220, the display information such as the electronic map content and/or the electronic map display effects are determined. In some embodiments, the terminal (e.g., the vehicle-mounted terminal) determines the electronic map content and/or display effects based on obtained driving information and an anticipated driving route. In some embodiments, the application server determines a driving route (e.g., the anticipated driving route) based on the current driving information and/or historical driving information and provides the anticipated driving route information to the terminal (e.g., the vehicle-mounted terminal).

In some embodiments, the terminal determines electronic map display content corresponding to the currently driven road, the anticipated next road, and signs along the road based on current driving information and an anticipated driving route and determines the use of the following display effects: The anticipated next road can be obtained from the anticipated driving route (or anticipated driving route information). For example, the terminal obtains the anticipated next road based on the anticipated driving route and a current location (e.g., of the terminal and/or vehicle).

In some embodiments, the currently driven road is displayed emphatically in relation to the anticipated next road. For example, the currently driven road is displayed with greater prominence than the anticipated next road. As an example, the name of the currently driven road is displayed in a more eye-catching (e.g., larger font, more vivid color, bolded font, flashing display, etc.) manner than the name of the anticipated next road. As another example, the currently driven road line is displayed in a more eye-catching (e.g., thicker, more brightly-colored line, etc.) manner than the anticipated next road line. A road line can be a representation of a road on the electronic map. For example, the road can be denoted by a solid line, a dashed line, a plurality of lines, etc. The road line can be displayed in one or more colors. For example, certain types of roads can be denoted in one format and certain other types of roads are denoted in a second format. In some embodiments, the anticipated next road is displayed emphatically in relation to other roads (e.g., roads that are not on the driving route, etc.). For example, the anticipated next road is displayed with greater prominence than other roads (not including the currently driven road).

In some embodiments, one or more objects such as signs and/or landmarks along the driving route are displayed in simulated reality form. For example, signs along the currently driven road are displayed in simulated reality form based on current driving speed. Displaying the objects (e.g., the road signs) along the currently driven road in a simulated reality form causes the objects to appear gradually as the objects are approached and to vanish gradually as the objects become more distant on the electronic map. In some embodiments, simulated reality corresponds to virtual reality. The one or more objects can be displayed in the simulated reality form (e.g., virtual reality form) based on virtual reality technology. The display of information in a simulated reality form can include display of one or more objects along the route in a manner that is similar that the user will view corresponding physical objects in the physical world. As an example, the display of information in a simulated related form displays one or more objects based at least in part on a context of the user, the terminal, and/or the vehicle. For example, as the vehicle approaches a location corresponding to one of the one or more objects displayed in the electronic map, the corresponding object can be displayed in a manner such that the object becomes larger as the vehicle becomes closer.

Virtual reality technology is a form of a computer simulation system that makes possible the creation and experience of virtual worlds. Virtual reality technology uses computers to generate a simulated environment, in which the user is immersed by a system simulation of physical actions and interactive, three-dimensional dynamic views that merge multiple sources of information. Virtual reality technology primarily comprises simulated environments, perception, natural skills, and sensing devices. In some embodiments, the electronic map is displayed based on simulated environments. A simulated environment is a computer-generated, real-time, dynamic, three-dimensional realistic image.

In some embodiments, display of the electronic map (or electronic map display content) is based at least in part on displaying one or more parts of the electronic map more emphatically in relation to another part of the electronic map, and displaying one or more objects in a simulated reality form. For example, the currently driven road is displayed emphatically in relation to an anticipated next road or another road on the electronic map, and one or more objects (e.g., along the currently driven road) are displayed in a simulated reality manner.

The following is a detailed description of the determining of the electronic map display content and/or the electronic map display effects. For example, a description is provided of the determination of the electronic map display content and/or the electronic map display effects based on particular pieces of driving information.

The current driving information (e.g., obtained by a vehicle-mounted terminal) can comprise multiple types of information. Various types of the information comprised in the current driving information are indicative of driving status. In some embodiments, the current driving information comprises one or more of: a current time, current environment information, current driving speed, information associated with (or corresponding to) current driving control operations, current position (or current location), current driving route, current driving direction, etc. The various aforementioned types of information that can be comprised in the current driving information are described further below.

Current time. The current time can be obtained from a clock (e.g., an internal clock) of the terminal, the vehicle, and/or the application server. The current time can be associated with information obtained from one or more sensors of the vehicle that obtain information associated with the current driving information. The current time can be obtained from a timestamp on the information obtained from one or more sensors of the vehicle that obtain information associated with the current driving information.

Current environment information. The current environment information can comprise one or more of ambient temperature, ambient light, and ambient humidity, which may be measured through corresponding sensors. The current driving information can also comprise weather information (e.g., a weather alert, a weather forecast), etc. The weather information can be obtained from the application server or another server that provides a weather service. The current environment information can comprise information associated with road closures, nearby traffic accidents, accidents along the driving route, traffic delays, etc.

Current driving speed. The current driving speed (e.g., a real-time driving speed) can be measured by a speed sensor mounted on (or connected to) the vehicle. In some embodiments, the current driving speed is calculated from change in detected position (e.g., longitude and latitude) and change-related length of time. The current driving speed can be calculated based on location information associated with the terminal and/or vehicle. For example, the location information associated with the terminal and/or vehicle can be obtained from a GPS (e.g., a GPS module associated with the terminal and/or vehicle), cellular tower information (e.g., the location of the terminal and/or vehicle can be determined based on the cellular towers with which the terminal/vehicle communicates), etc.

Current position (or current location). The current position (or current location) can be represented in longitude and latitude coordinates. In some embodiments, the current position (e.g., longitude and latitude) is detected using a position-detecting sensor. In some embodiments, the current position is obtained by a satellite positioning module, cellular tower information (e.g., the location of the terminal and/or vehicle can be determined based on the cellular towers with which the terminal/vehicle communicates), etc.

Current driving route (e.g., the road name of the currently driven route). The current driving route can comprise a travel track. A travel track can be a representation of a road on the electronic map. The travel track can denote a route. For example, the travel track can be overlaid over one or more roads or paths, etc. For example, the road can be denoted by a solid line, a dashed line, a plurality of lines, etc. The road line can be displayed in one or more colors. For example, certain types of roads can be denoted in one format and certain other types of roads are denoted in a second format. In some embodiments, the current driving route is determined based at least in part on position information (or location information) associated with the terminal and/or vehicle. The current driving information can be determined based on position information associated with the terminal and/or vehicle over a predefined period of time and/or over a predefined distance. For example, a single point of position information is not as indicative of a travel track as a series of points of position information corresponding to a series of information obtained at a series of predefined times and/or a series of predefined distances. The terminal can use position information obtained for a period of time (e.g., a period of time projected into the future from the current moment) as a basis to obtain the travel track for that period of time and thus to obtain the driving route.

Current driving direction. The terminal can use position information obtained for a period of time as a basis to obtain the travel track for that period of time. The terminal can determine a current driving direction based on the travel track or the driving route corresponding to the travel track. In some embodiments, the current driving direction is determined based at least in part on a turn signal start operation detected by a sensor used for detecting a turn signal.

Information relating to current driving control operations. The current driving control operations can comprise various operations to control vehicle travel. In some embodiments, the current driving control operations include one or more of the following: a gearshift control operation, a steering control operation, a windshield wiper control operation, an automatic cruise control operation, a navigation operation, etc. In some embodiments, the control operations are detected by the sensors and sent via data cables or via wireless connections to the processor/control system. A description of various types of driving control operations is provided below.

Gearshift control operation. The gearshift control operation comprises one or more of: information indicative of a current gear in which the vehicle is operating, information indicative of a change in a gear in which the vehicle is operating, information indicative of a type of gear in which the vehicle is operating (e.g., a high gear, a low gear, etc.), etc. As an example, the gearshift control operation is detected by one or more sensors mounted at gearshift positions or on gearshift position cables. As another example, the gearshift control operation is detected from operating signals on the corresponding signal cables. For example, the one or more sensors can detect whether the gear position is high or low, or whether the gear position is park or reverse.

Steering control operation. The gearshift control operation comprises one or more of: information indicative of a current direction in which the steering is operated, information indicative of a status of a turn signal, etc. The steering control operation can be detected based at least in part on one or more sensors mounted at the turn signal lamps, on turn signal cables, on the steering column, on the steering wheel, etc. The steering control operation can be detected based on corresponding signal cables (e.g., by detecting whether the left turn signal lamp or the right turn signal lamp is on).

Windshield wiper control operation. The windshield wiper control operation comprises one or more of: information indicative of a current speed at which the windshield wiper control is operating, information indicative of a change in speed at which the windshield wiper control is operating, information indicative of a type of level at which the windshield wiper is operating (e.g., a high speed, a low speed, etc.), information indicative of a type of windshield wiper that is operating (e.g., a front windshield wiper, a rear windshield wiper, etc.), information indicative of a speed and/or status of each windshield wiper, etc. The windshield wiper control operation can be detected by one or more sensors mounted at the windshield wipers and/or on windshield wiper cables. The windshield wiper control operation can be detected from operating signals on corresponding signal cables. If the one or more sensors detect that the windshield wipers are on, the terminal can determine that the vehicle is operating in a condition of rain. In some embodiments, the terminal determines that the vehicle is operating in a condition of rain if the windshield wiper control operation indicates that the windshield wiper is operating for at least a threshold period of time (e.g., to distinguish from the instance according to which the windshield wiper is used to clean the windshield or to remove debris from the windshield). The terminal can determine whether the rain is heavy or light according to the windshield wiper speed.

Automatic cruise control operation. The automatic cruise control operation comprises one or more of: information indicative of whether the automatic cruise control is on or off, information indicative of a current speed at which the automatic cruise control is set, information indicative of a length of time for which the automatic cruise control is set as on, information indicative of a change in the automatic cruise control setting, etc. The automatic cruise control operation can indicate a switching between automatic cruise and manual cruise operations. The automatic cruise control operation can be detected based at least in part on operating signals on the corresponding signal cables.

Navigation operation. The automatic cruise control operation comprises one or more of: information indicative of whether a navigation function is set on or off. The navigation operation can correspond to a toggle operation to turn navigation on or off.

The historical driving information (e.g., obtained by a vehicle-mounted terminal) can comprise multiple types of information. Various types of the information comprised in the historical driving information is indicative of historical (or past) driving status. The historical driving information can be obtained from a user, a terminal, a plurality of users, a plurality of terminals, a plurality of vehicles, etc. In some embodiments, the historical driving information is associated with a user, a terminal, a plurality of users, a plurality of terminals, a plurality of vehicles, etc. In some embodiments, the historical driving information comprises one or more of previously set target addresses (e.g., previous destinations such as the target address information set by the most recent navigation operation, or the target address information set by a predefined number of most recent navigation operations), or previous position information, historical travel tracks, previously set target POIs, previously visited destinations, etc. The historical travel tracks can comprise information such as driving routes and/or driving times. The historical driving information can comprise user preferences, etc.

Internet transaction system-based transaction information can comprise transaction information associated with a user and/or a purchase or order. For example, the transaction information can comprise information corresponding to not yet delivered orders (e.g., orders in transit or awaiting delivery), and corresponding delivery addresses. The terminal can display transaction information or mark the corresponding delivery address on the electronic map. For example, the electronic map display content can comprise transaction information (e.g., a delivery address, etc.). The terminal can plan a route (e.g., determine a driving route) from the current position to the delivery (e.g., the corresponding delivery address), and mark the driving route on the electronic map. In some embodiments, the terminal is associated with an Internet transaction system of the user. An identifier associated with a terminal (e.g., the terminal ID) can be used as a basis to obtain transaction information from the Internet transaction system associated with a transaction for a user. For example, the terminal can obtain the transaction information from the Internet transaction system. The terminal can send a request for transaction information from the Internet transaction system. In response to receiving a request for transaction information, the Internet transaction system can query a database or the mapping of transaction information to users or terminals, and provide the corresponding transaction information to the terminal.

According to various embodiments, an electronic map display embodiment corresponding to one or more types of the driving information is stored. One or more electronic map display embodiments can be set based on (or to correspond to) one or more of the types of driving information described above. The electronic map display content can be configured based at least in part on a corresponding electronic map display embodiment. For example, preset electronic map strategies may comprise one or any combinations of the strategies described below. An electronic map display embodiment can have one or more corresponding rules that are predefined. For example, the one or more rules corresponding to an electronic map display embodiment can be set according to criteria for displaying information for contexts when the electronic map display embodiment is applicable.

Embodiment 1

According to the electronic map display embodiment corresponding to Embodiment 1, when the vehicle is traveling, content other than point-line-plane content is hidden on the electronic map. Hiding content other than the point-line-plane content reduces (e.g., minimizes) interfering elements provided on the electronic map. The point-line-plane content can correspond to a line representing a driving route overlaid with the applicable roads corresponding to the driving route.

A rule corresponding to the electronic map display embodiment corresponding to Embodiment 1 can be set. For example, Table 1 provides rules predefined for determining an electronic map display map associated with the electronic map display embodiment corresponding to Embodiment 1.

TABLE 1

Rule for determining display content and map scale

| Vehicle speed threshold value | POI Duration | POI quantity | Categories of display content (categories of display objects) |
|---|---|---|---|
| 0 | | All | All |
| >0 | 30 sec | <50 | Topography, roads, buildings, public facilities, pushed information |
| 30 km/h | 20 sec | <40 | Topography, roads, buildings, public facilities, pushed information |
| 60 km/h | 10 sec | <30 | Topography, roads, buildings, public facilities |
| 80 km/h | 5 sec | <20 | Topography, roads, buildings, public facilities |
| 100 km/h | 5 sec | <10 | Topography, roads |
| >120 km/h | 3 sec | <5 | Topography, roads |

Referring to Table 1, various roads comprised in electronic map display content can be categorized according to one or more characteristics corresponding to the various roads. Roads comprised in electronic map display content can be differentiated according to different levels. Different levels can be denoted by the boundaries defined by the vehicle speed threshold values. For example, levels are associated with one or more roads comprised in the electronic map display content based at least in part on one or more vehicle speed threshold values (e.g., a speed of the vehicle, etc.). The levels associated with one or more roads comprised in the electronic map display content (e.g., the displayed roads) are set based on different vehicle speed threshold values. For example, when vehicle speed is relatively high, only higher-level roads (such as main arteries, freeways, etc.) are displayed, and when vehicle speed is relatively low, both high and low-level roads (such as small country roads or narrow streets) can be displayed. The rules determining display content and map scale (e.g., according to vehicle speed threshold values) can be configurable such as by a user.

Referring to Table 1, if the vehicle is currently not moving (vehicle threshold value=0), then all of the content is displayed on the electronic map; if the vehicle speed is under 30 km/h for a duration of 30 sec, then the quantity and types of POIs displayed on the electronic map are reduced; if the vehicle speed is between 30 km/h and 60 km/h for a duration of 10 sec, then the quantity and types of POIs displayed on the electronic map are further reduced; etc. According to various embodiments, the higher the vehicle speed, the less content that is displayed on the electronic map (e.g., comprised in the electronic map display content). For example, an amount of content displayed on an electronic map is inversely related to a vehicle speed. Furthermore, as vehicle speed increases, content that is not closely related to driving or the route is hidden (e.g., not displayed). The modification of an amount and/or scope of content displayed on the electronic map based at least in part on the vehicle speed can help the driver or passengers to understand the road situation and obtain effective electronic map information without being distracted by excessive information. Moreover, the modification of an amount and/or scope of content displayed on the electronic map based at least in part on the vehicle speed can improve trip safety.

According to various embodiments, various roads comprised in electronic map display content can be categorized according to one or more characteristics corresponding to the various roads. Roads comprised in electronic map display content can be differentiated according to different levels. For example, levels are associated with one or more roads comprised in the electronic map display content based at least in part on one or more speed limits associated with the corresponding one or more roads. The levels associated with one or more roads comprised in the electronic map display content (e.g., the displayed roads) are set based on different speed limits of the one or more roads. Display of roads having a certain level (or a certain set of levels) can be determined based at least in part on user input, user settings, and/or user preferences.

Embodiment 2

According to the electronic map display embodiment corresponding to Embodiment 2, an electronic map scale of the electronic map being displayed can be modified based at least in part on a movement of the vehicle (or terminal). For example, when the vehicle is traveling (e.g., in response to the terminal determining that the vehicle is moving), the electronic map scale changes as vehicle speed changes in order to accommodate the desired electronic map viewing speed and scope of the driver and/or passenger. The desired electronic map viewing speed and scope can vary according to different driving speeds.

A rule corresponding to the electronic map display embodiment corresponding to Embodiment 2 can be set. For example, Table 2 provides rules predefined for determining electronic map scale associated with the electronic map display embodiment corresponding to Embodiment 2.

TABLE 2

Rules for determining map scale

| Vehicle speed threshold value | Duration | Scale |
|---|---|---|
| 0 | | Default scale (e.g., 1:1) |
| >0 | 30 sec | 1:10 |
| ≥30 km/h | 20 sec | 1:25 |
| ≥60 km/h | 10 sec | 1:50 |
| ≥80 km/h | 5 sec | 1:100 |
| ≥100 km/h | 5 sec | 1:200 |
| >120 km/h | 3 sec | 1:500 |

Referring to Table 2, a scale of the electronic map displayed is determined based at least in part on a vehicle speed. The scale of the electronic map displayed can be based at least in part on a duration for which a vehicle is traveling within one or more vehicle speed ranges. According to various embodiments, the scale of the electronic map is inversely related to the speed of the vehicle. For example, if the vehicle is moving at high speed, a scale is modified to provide the electronic map in a zoomed-out manner (e.g., to allow a user to see a larger amount of the electronic map). If the vehicle is currently not moving (vehicle threshold value=0), then the electronic map can be displayed in accordance with the default scale (e.g., the default scale can be 1:1). If the vehicle speed is under 30 km/h (but greater than 0) for a duration of 30 sec, then the electronic map scale is adjusted to 1:10; if the vehicle speed is between 30 km/h and 60 km/h for a duration of 20 sec, then the electronic map scale is adjusted to 1:25; etc. The higher the vehicle speed is, the smaller the electronic map scale becomes, thus making understanding the driving route (e.g., the upcoming directions or route) easier for the driver and passengers. For example, when the vehicle is traveling slowly, the map scale increases, which allows for an understanding of more detailed content (e.g., landmarks, POIs, etc.). Conversely, to ensure acquisition of effective electronic map information and trip safety when the vehicle is traveling quickly, a smaller map scale allows a quick grasp of the trip route while omitting concrete details.

Embodiment 3

According to the electronic map display embodiment corresponding to Embodiment 3, electronic map display effects can be modified based at least in part on a location of the vehicle (or terminal). For example, the electronic map display effects can be modified based at least in part on a relative location of the vehicle (or terminal) to an object in the electronic map display content. As an example, when the vehicle is traveling, display effects for road names and POIs on the electronic map vary according to the corresponding distances of the roads, POIs, etc. from the vehicle position. The display for objects relatively close to the vehicle is intensified (e.g., displayed in a more emphatic manner such as more detail, brighter, etc.), and the display of objects relatively far from the vehicle is weakened (e.g., displayed in a less emphatic manner). Furthermore, as vehicle position changes, the display effects for road names and POIs can undergo a gradual, natural change to help the driver or passengers have a better understanding of upcoming (e.g., imminent) information such as road section names or of information on nearby POIs.

A rule corresponding to the electronic map display embodiment corresponding to Embodiment 3 can be set. For example, Table 3 provides rules predefined for determining display effects associated with the electronic map display embodiment corresponding to Embodiment 3. The rules predefined for determining display effects associated with the electronic map display embodiment corresponding to Embodiment 3 can comprise rules for providing an electronic map display effect in a simulated reality form.

TABLE 3

| Rule for determining electronic map display effects | | |
|---|---|---|
| Distance threshold value | Display size (relative to display size for up to 10 m) | Transparency |
| ≤10 m | 100% | 0% |
| ≤20 m | 90% | 10% |
| ≤50 m | 80% | 20% |
| ≤100 m | 70% | 30% |

TABLE 3-continued

| Rule for determining electronic map display effects | | |
|---|---|---|
| Distance threshold value | Display size (relative to display size for up to 10 m) | Transparency |
| ≤500 m | 50% | 40% |
| ≤1,000 m | 30% | 50% |
| >1,000 m | 20% | 70% |

Referring to Table 3, electronic map display effects are determined based at least in part on a current position of the vehicle or terminal. According to various embodiments, a distance between an object comprised in the electronic map display content (e.g., a POI, etc.) and a current position of the vehicle and/or terminal is used in connection with determining electronic map display effects. For example, the distance is compared to one or more thresholds in connection with determining electronic map display effects. POIs on the electronic map that are within 10 m of the current position (e.g., of the vehicle and/or terminal) may be displayed at 100% size and 0% transparency; POIs on the electronic map that are from 10 m to 20 m of the current position may be displayed at 90% size and 10% transparency; POIs on the electronic map that are from 20 m to 50 m of the current position may be displayed at 80% size and 20% transparency; etc. Thus, the electronic map display effects for POIs on the electronic map can vary according to position (e.g., of the terminal and/or vehicle). Information about POIs that are closer to the current position are displayed more clearly (e.g., in a larger size). In some embodiments, the electronic map can be updated according to one or more predefined time thresholds. In some embodiments, the electronic map is updated based according to when the terminal obtains information indicating a then-current position of the terminal and/or vehicle. With the electronic map being updated periodically, the near and far display effects that are achieved enable the driver or passengers to have a more detailed and clearer understanding of nearby conditions. Conversely, far away POIs can be displayed less clearly (e.g., in a smaller size or scale such as a scaled down size of an original size corresponding to the POI) so that the user can acquire effective map information while being assured of a safe trip.

Further to the above description, when a terminal (e.g., a vehicle-mounted terminal) determines electronic map display content and/or electronic map display effects based on acquired driving information, the terminal determines the currently driven road and POIs along the road included in the electronic map display content based on obtained driving information and determines electronic map display effects. Examples of electronic map display effects that can be determined based on the driving information are described below.

Display Effect 1

According to the electronic map display effect corresponding to display effect 1, one or more objects on the electronic map are displayed more emphatically in relation to one or more other objects on the electronic map. In some embodiments, POIs along the currently driven road are displayed with greater prominence than POIs along other roads. For example, the name of the currently driven road is displayed in a more eye-catching (e.g., larger font, more vivid color, flashing display, or otherwise more emphatic, etc.) manner than the names of other roads. As another example, the currently driven road line is displayed in a more eye-catching (e.g., thicker line, more brightly-colored line, or otherwise more emphatic, etc.) manner than the other road lines. In some embodiments, the anticipated next road is displayed with greater prominence than other roads (not including the currently driven road). The electronic map display effect corresponding to display effect 1 can be updated dynamically.

Display Effect 2

According to the electronic map display effect corresponding to display effect 2, the display of one or more objects on the electronic map is modified based at least in part a current driving speed. In some embodiments, a display of one or more POIs (e.g., along the driving route) on the electronic map is modified based at least in part on a current driving speed. For example, in accordance with driving speed and changing position of the terminal and/or vehicle, display of POIs far from the current position (of the terminal and/or vehicle) is fainter and/or smaller than the display of POIs near the current position, and display of POIs near the current position is more intense and/or larger than that of POIs far from the current position. Thus, display effects for POIs along both sides of the currently driven road are intensified, and the farther away a POI is in relation to a current position, the weaker and/or smaller display of such POI will be. As the vehicle moves, and as POIs that were previously far away become closer in relation to a current position, display of such POIs become large and/or intense. Display of POIs that were close in relation to a previous position becomes small and/or weak as the vehicle and/or terminal moves further away from the POI (e.g., as a distance between the terminal and the POI increases). The electronic map display effect corresponding to display effect 2 can be updated dynamically.

Display Effect 3

According to the electronic map display effect corresponding to display effect 3, one or more objects on the electronic map are displayed more emphatically in relation to one or more other objects on the electronic map and display of one or more objects on the electronic map is modified based at least in part on a current driving speed. For example, display effect 3 comprises a combination of display effect 1 and display effect 2 described above. The electronic map display effect corresponding to display effect 3 can be updated dynamically.

In some embodiments, display of a road line (e.g., of a road comprised in the electronic map) is set (e.g., determined and/or displayed) based at least in part on a distance between the road and a current position of the terminal and/or vehicle. For example, one or more characteristics associated with a road line can be set based at least in part on a distance between the road and a current position of the terminal and/or vehicle. As an example, the thickness of a road can be modified based at least in part on a distance between the road and a current position of the terminal and/or vehicle. The thickness of a road near (e.g., within a predefined distance threshold) the current position is relatively thicker, and the thickness of a road far (e.g., exceeding a predefined distance threshold) from the current position is relatively thinner.

In some embodiments, one or more electronic map display effects are set to 2-dimensional (2D) display or 3-dimensional (3D) display according to a current speed of the terminal. For example, the electronic map display effects can be displayed in a 2D display or a 3D display according to differences in speed. For example, one or more objects displayed on the electronic map are displayed in a 2D display setting if the current speed is greater than one or more speed thresholds. The one or more objects displayed in the 2D setting can be a subset of the objects comprised in the electronic map. As another example, one or more objects displayed on the electronic map are displayed in a 3D setting if the current speed is less than (or equal to) one or more speed thresholds. The one or more objects displayed in the 3D setting can be a subset of the objects comprised in the electronic map. According to various embodiments, display of one or more objects comprised in the electronic map is toggled between a 2D setting and a 3D setting based at least in part on a current speed of the terminal and/or vehicle. To minimize expenditure of resources by the processor, when displaying the electronic map, 3D display is employed in connection with the terminal and/or vehicle traveling at lower vehicle speeds, and 2D display is employed in connection with the terminal and/or vehicle traveling at higher vehicle speeds.

According to various embodiments, display of one or more objects comprised in the electronic map is toggled between a 2D setting and a 3D setting based at least in part on a current distance between the one or more objects and the terminal and/or vehicle.

According to various embodiments, an electronic display effect is applied to one or more upcoming objects. An upcoming object can correspond to an object that is along the driving route and which is within a preset threshold distance of a current position of the terminal, or which is within a preset threshold time at which the vehicle will reach the object based on a speed of the vehicle and/or terminal (e.g., as determined using a current speed, an average speed, a speed limit along the route, etc.), or any combination thereof. In some embodiments, the vehicle-mounted terminal prominently displays on the electronic map the name of the current road and the name of the next road. For road signs along simulated reality roads, the terminal employs the effect of making objects (e.g., road signs) appear gradually as such objects are approached and causing the objects to vanish (e.g., from display thereof) gradually as such become more distant and thus enables the driver to see the names of the roads deemed to be important while driving.

Embodiment 4

According to the electronic map display embodiment corresponding to Embodiment 4, the electronic map display content and/or electronic map display effects are updated or modified based at least in part on a driving condition or a driving control operation. For example, the electronic map display content and/or electronic map display effects are updated based at least in part on a steering control operation. When the vehicle with a terminal is traveling, the electronic map display is updated according to turn signal operations. For example, the electronic map display can be updated in a manner so as to match the electronic map display with the practical focus of the driver or passenger under different conditions and thus to present appropriate and effective information or alerts. For example, a turn icon corresponding to current road lane information is highlighted based on a turn signal operation so as to inform the driver which lanes of the current road can be taken. As an example, in the case that the current road has 5 lanes, and the two left lanes turn left, and the three right lanes go straight ahead, then in response to determining that the left turn signal is on, the two left-turn icons on the left are highlighted in a display of the electronic map. For example, the two left-turn icons on the left are highlighted in the lane information of the electronic map.

In some embodiments, the use of the driving condition or a driving control operation in connection with determining (e.g., updating or modifying) the electronic map display content and/or electronic map comprises determining that the driving condition or a driving control operation is static for a predefined threshold period of time. Accordingly, if a user erroneously turns on a turn signal (and turns off the turn signal), the terminal can refrain from updating of modifying the electronic map display content and/or electronic map.

As another example, in response to determining that the left turn signal is on, the terminal (e.g., the vehicle-mounted terminal) anticipates a change in the vehicle driving route (e.g., change to a left lane or a left-turn road) and thus updates the electronic map in order to display the electronic map according to the anticipated route (e.g., in accordance with the anticipated change corresponding to the turn).

As another example, in response to determining that the right turn signal is on, the terminal (e.g., the vehicle-mounted terminal) anticipates a change in the vehicle driving route (e.g., change to a right lane or a right-turn road) and thus updates the electronic map in order to display the electronic map according to the anticipated route (e.g., in accordance with the anticipated change corresponding to the turn).

As another example, in response to determining that the brake light is on (e.g., for at least a threshold period of time), the terminal (e.g., the vehicle-mounted terminal) obtains road condition information (e.g., obtains the information from a network such as by sending a request for road condition information to an application server) for the driving route ahead and displays at least part of the obtained road condition information on the electronic map in order to indicate upcoming road conditions (e.g., whether the driving route has congestion or an accident on the road segment ahead).

As another example, in response to determining that the high beams are on (e.g., for at least a threshold period of time), the terminal (e.g., the vehicle-mounted terminal) provides a recommendation to the user such as a recommendation to turn off the high beams (or turn on the regular driving lights). The recommendation can be provided based at least in part on the conditions of the current road segment. For example, if there is considerable (e.g., in relation to one or more thresholds) two-way traffic on the current road segment, the terminal can provide a recommendation on the electronic map for turning off the high beams of the vehicle. For example, such a recommendation can be provided to improve the driving safety of vehicles in the oncoming traffic lanes. As another example, the road conditions of the road segment ahead are displayed on the electronic map to prompt the driver to drive safely.

Embodiment 5

According to the electronic map display embodiment corresponding to Embodiment 5, the electronic map display content and/or electronic map display effects are updated or modified based at least in part on a driving condition or a driving control operation. For example, the electronic map display content and/or electronic map display effects are updated based at least in part on a gearshift control operation. The display of the electronic map can be updated according to changes in vehicle gearshift position. For example, the display of the electronic map is updated according to changes in vehicle gearshift position so as to match the electronic map display with the practical focus of the driver or passenger under different conditions and thus to present appropriate and effective information or alerts.

As an example, in response to determining that the vehicle is in high gear (e.g., for at least a threshold period of time), electronic map display content and/or electronic map display effects are determined according to the current vehicle speed as described above. In some embodiments, the terminal determines whether the vehicle and/or terminal is currently exceeding the speed limit for the current road segment, and in response to determining that the vehicle is approaching (e.g., is within a threshold limit) or has exceeded the speed limit, the electronic map displays appropriate alert information. The appropriate alert information can comprise a warning to a user, a recommendation to the user to reduce a speed, etc.

As an example, in response to determining that the vehicle is in low gear (e.g., for at least a threshold period of time), electronic map display content and/or electronic map display effects are determined according to the current vehicle speed as described above.

As an example, in response to determining that the vehicle gear shift is in park (e.g., for at least a threshold period of time), the terminal can determine whether a current position (e.g., location) of the vehicle corresponds to a legal parking space or whether the current location of the vehicle is a parking violation high-risk zone. The terminal can determine whether the current location corresponds to a legal parking space or a parking violation high-risk zone based on obtained driving information. Locations corresponding to parking can be comprised in the electronic map (e.g., the electronic map display content). The terminal can display (e.g., in connection with the electronic map) an indication of whether the current location corresponds to a legal parking space or a parking violation high-risk zone. For example, the indication is provided on the electronic map. As another example, the terminal provides an indication of (e.g., displays or marks) nearby parking spaces on the electronic map. The terminal can display a road segment that has a high incidence of parking violations with a bright warning while also displaying a recommended nearby parking lot on the electronic map.

As an example, in response to determining that the vehicle is in reverse gear (e.g., for at least a threshold period of time), the terminal (e.g., vehicle-mounted terminal) obtains information on the surroundings or road conditions behind the vehicle and provides the appropriate alerts or marks on the electronic map.

The above strategies may be used singly or in combination with each other. In addition, the above strategies are given merely for the purpose of providing examples. Embodiments of the present application are not limited to the above strategies in updating display of electronic maps.

In some embodiments, which build on the foundation of all the embodiments above, the terminal (e.g., the vehicle-mounted terminal) switches the electronic map to driving mode if no operating instruction directed at the electronic map is received within a set length of time and driving information indicates driving status. The electronic map content other than point, line, and plane can be hidden in driving mode. Operating instructions directed at the electronic map could be generated based on the user touching the electronic map display screen or otherwise providing to the terminal an input for controlling the electronic map. In some embodiments, the operating instructions are generated through a speech control system in response to the user providing a voice input (e.g., saying) corresponding to an operating instruction. In some embodiments, the operating instructions are generated based on user operation of an electronic map control button.

In some embodiments, which build on the foundation of all the embodiments above, if the vehicle-mounted terminal screen remains untouched for a certain duration while the vehicle is driving, the electronic map enters driving mode. In some embodiments, the terminal dynamically and/or automatically updates the electronic map (e.g., the electronic map display content and/or the electronic map display effects) if the electronic map is in a driving mode. As an example, conflicts with user operations on the vehicle-mounted terminal screen can be avoided based on a requirement that the electronic map be in a driving mode if the electronic map is to be dynamically and/or automatically updated. In some embodiments, electronic map display is updated automatically only when the user has not performed screen operations.

As an example, road color, thickness, road name display intensity, and POI display category and quantity are first defined for different map scales so as to enable display content to have a higher availability at each map scale. Then the electronic map will enter driving mode if, while the driver is driving the vehicle, the electronic map is not subjected to any operation and the vehicle continues to be driven. In this mode, all content other than map point, line, and plane is entirely hidden so as to assure more space for display of map data in the driving mode. At the same time, the vehicle-mounted terminal automatically adjusts the map scale based on changes in vehicle speed.

In some embodiments, one or more objects (e.g., POIs) comprised in the electronic map comprise an update setting for one or more characteristics with respect to objects. For example, the one or more objects can be set to a status of permanent, updateable, and/or hidden. In some embodiments, the electronic map can be set to a status of permanent, permanent-background updateable, and/or hidden. Examples of the statuses are described below.

Permanent. An object having a permanent status can correspond to an object that occupies a large area of land and remains a driving reference for the driver whether vehicle speed is high or low. Examples of objects having a permanent status (e.g., permanent POIs) include: mountains, rivers, freeways, and urban roads. In some embodiments, permanent POIs are displayed normally and are generally based on visual design. In some embodiments, a permanent POI does not change in connection with a dynamic update or an automatic update. For example, a permanent POI does not change when the terminal dynamically or automatically updates the electronic map while the vehicle is moving. An absolute position of the permanent POI does not change, etc.

Permanent-background. An object having a permanent-background status can correspond to an object that does not occupy a large area of land, and the vehicle quickly passes its position while traveling at low speed. In some embodiments, an object having a permanent-background status (e.g., permanent background POIs) serves as a driving reference for the driver. Examples of permanent-background POIs include: buildings, sub-district roads, subway stops, etc. The display effects for electronic map content corresponding to permanent-background objects (e.g., permanent-background POIs) can be weakened based on visual design.

Hidden: An object having a hidden status can correspond to an object that is not along a driving route (e.g., a current driving route, an anticipated driving route, etc.). For example, an object having a hidden status (e.g., a hidden POI) corresponds to an object that the terminal determines the terminal and/or the vehicle will not pass along the driving route. For example, the vehicle is determined to not pass the position corresponding to the hidden POI. In some embodiments, an object that is deemed to not serve as a reference (e.g., driving reference) to the user (e.g., the driver of the vehicle) is determined to be a hidden POI. For example, the terminal determines whether an object is to serve as a reference based at least in part on a driving speed. Examples of hidden POIs include: subway routes, railways, buildings along roads that are not within a threshold distance of the current position, etc. Such content corresponding to the object having a hidden status is not displayed on the electronic map.

The following approaches can be used in connection with hiding a hidden object (e.g., a hidden POI) or other electronic map content:

Approach 1: When an electronic map is to be plotted, a pre-customized map plotting file (e.g., a Photoshop style pack) is extracted according to the current vehicle speed range. The content that is determined to be hidden is hidden (or excluded) during the plotting process.

Approach 2: After a map is plotted, the elements that are to be hidden are hidden by controlling display of such elements on the electronic map in response to a change in vehicle speed.

Figure 3:
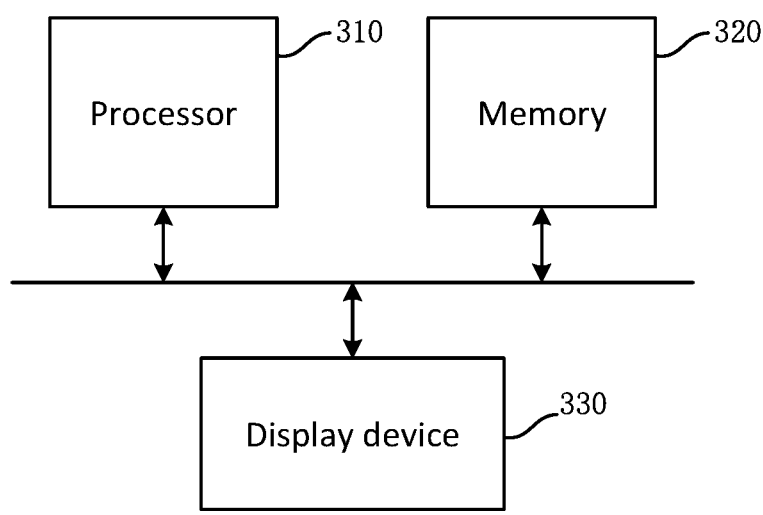
FIG. 3 is a functional diagram of a device according to various embodiments of the present disclosure.

FIG. 3 is a functional diagram of a device according to various embodiments of the present disclosure.

Referring to FIG. 3, device 300 is provided. Device 300 can implement at least part of system 100 of FIG. 1 and/or process 200 of FIG. 2. Device 300 can be implemented at least in part by computer system 400 of FIG. 4.

As illustrated in FIG. 3, device 300 comprises a processor 310, memory 320, and a display device 330. Device 300 can comprise one or more sensors (not shown). In some embodiments, device 300 is connected to one or more sensors. For example, device 300 can correspond to a terminal (e.g., that is connected to a vehicle or that is mounted to a vehicle), and the one or more sensors can be comprised in the vehicle (e.g., one or more modules of the vehicle can have a sensor that obtains information such as information corresponding to the one or more modules, and the obtained information can communicated to a bus of the vehicle, etc.).

The processor 310 may be a general processor (e.g., a microprocessor or any conventional processor), a digital signal processor, an application-specific integrated circuit, a field-programmable gate array or other programmable logic device, a discrete gate or transistor logic, a hardware processor, or a discrete hardware component. Memory 320 specifically may comprise internal memory and/or external memory, e.g., random access memory, flash memory, read-only memory, programmable read-only memory, electrically erasable programmable memory, a register, or another mature storage medium in the art. The display device 330 may comprise a touchscreen control circuit.

The processor 310 has data communication links with all other modules. For example, it can engage in data communication based on a bus architecture. The bus architecture may include any quantity of interconnected buses and bridges linking together one or more processors represented by processor 310 and various memory circuits represented by memory 320. The bus architecture can further link together various other circuits such as those of peripheral devices, voltage stabilizers, and power management circuits. All of these are known in the art and thus will not be described further herein. Interfaces are provided by bus interfaces. The processor 310 is responsible for managing bus architecture and general processing. Memory 320 can store the data used by the processor 310 when executing operations.

A method for providing an electronic map can be implemented by processor 410. During implementation, each step in the notification message processing flow can be completed by an integrated logic circuit of the hardware in the processor 310 or by a software instruction. Each method, step, and logic block disclosed by various embodiments of the present application can be thus implemented or executed. Steps of methods disclosed by embodiments of the present application may be directly embodied as hardware and completed by the processor. In some embodiments, the methods, steps, and/or logic blocks may be completed by a combination of hardware and software modules in the processor. A software module may be located in random access memory, flash memory, read-only memory, programmable read-only memory, electrically erasable programmable memory, a register, or another mature storage medium in the art.

Processor 310, coupled to memory 320, can be configured to read the computer program instructions stored by the memory 320.

Processor 310 can execute operations according to computer program instructions. The operations executed by processor 310 include obtaining current driving information and/or historical driving information; determining electronic map display content and/or electronic map display effects based on obtained driving information; and outputting a to-be-displayed electronic map to the display device 330 for display based on the electronic map display content and/or electronic map display effects that were determined.

In some embodiments, operations executed by processor 310 include obtaining current driving information and/or historical driving information from a network-side application server and/or a local control system.

In some embodiments, the historical driving information comprises one or any combination of the following types of information: previously set target addresses or position information; historical travel tracks, the historical travel tracks comprising driving routes and/or driving times; previously set target POI information; previously visited destinations; Internet transaction system-based transaction information, etc.

In some embodiments, operations executed by processor 310 include using obtained driving information as a basis to determine one or more of category, level, and quantity of content in need of display on an electronic map.

In some embodiments, operations executed by processor 310 include determining one or any combination of the following map display effects based on obtained driving information: map scale; one or more of: line thickness and color for marking routes; one or more of: POI size and color; and three-dimensional display effects.

In some embodiments, operations executed by processor 310 include executing one or any combination of the following operations: determining current electronic map display content based on current driving speed and one or more of category, quantity, and level of electronic map display content corresponding to preset different driving speeds; determining current electronic map scale based on current driving speed and electronic map scales corresponding to preset different driving speeds; determining display effects of display content on the current electronic map based on current position and preset display effects of display content for different distance ranges relative to the current position; marking a turning icon corresponding to lane information on the current road on the electronic map based on the current turn signal operation; determining whether the current parked position is legal and indicating the same on the electronic map and/or marking a parking lot near the current position on the electronic map upon determining that the current status is parked status based on the current gearshift operation.

In some embodiments, operations executed by processor 310 include determining the currently driven road and POIs along the road included in electronic map display content based on acquired driving information and determining use of one or any combination of the following display effects: POIs along the currently driven road are displayed with greater prominence than POIs along other roads; in accordance with driving speed and changing position, display of POIs far from the current position becomes gradually fainter and smaller than that of POIs near the current position.

In some embodiments, operations executed by processor 310 include, after acquiring current driving information and/or historical driving information, anticipating a driving route based on acquired driving information; or receiving anticipated driving route information sent by a network-side application server, wherein said anticipated driving route information is determined by said application server based on current and/or historical driving information.

In some embodiments, operations executed by processor 310 include determining electronic map display content and/or display effects based on acquired driving information and an anticipated driving route.

In some embodiments, operations executed by processor 310 include determining display on the electronic map of the currently driven road, an anticipated next road, and signs along the road based on current driving information and an anticipated driving route, and determining use of one or any combination of the following display effects: the currently driven road is displayed with greater prominence than the anticipated next road; road signs along the currently driven road are displayed in simulated reality form based on current driving speed so as to cause the road signs along the currently driven road to appear gradually as they are approached and to vanish gradually as they become more distant on said electronic map.

In some embodiments, operations executed by processor 310 include switching the electronic map to driving mode if no operating instruction directed at the electronic map is received within a set length of time and driving information indicates driving status; the electronic map content other than point, line, and plane is hidden in the driving mode.

Figure 4:
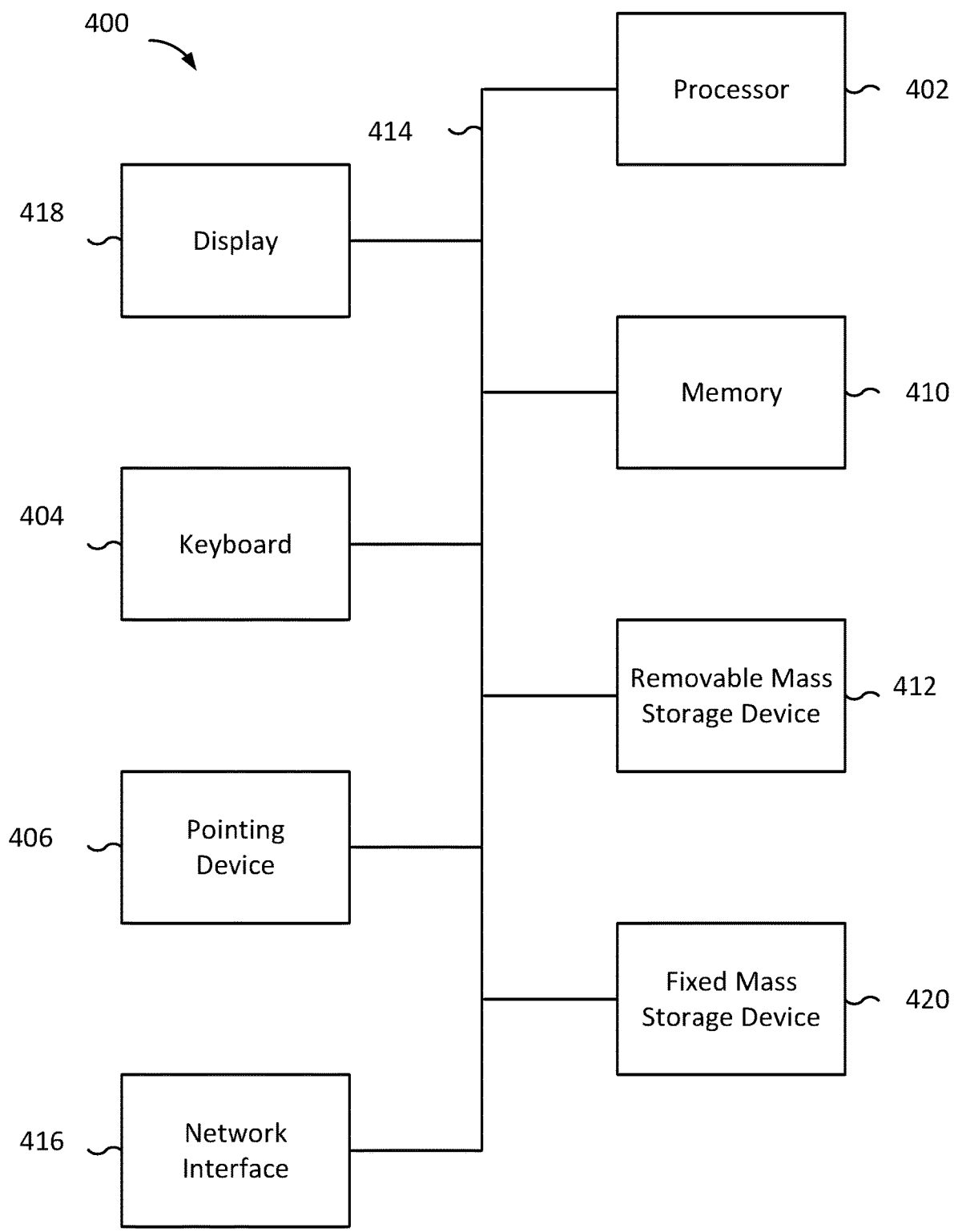
FIG. 4 is a functional diagram of a computer system for performing network control according to various embodiments of the present disclosure.

FIG. 4 is a functional diagram of a computer system for performing network control according to various embodiments of the present disclosure.

Referring to FIG. 4, computer system 400 is provided. Computer system 400 can implement at least part of system 100 of FIG. 1. Computer system 400 can implement at least part of process 200 of FIG. 2 and/or device 300 of FIG. 3.

Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418).

Processor 402 is coupled bi-directionally with memory 410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also as is well known in the art, primary storage typically includes basic operating instructions, program code, data, and objects used by the processor 402 to perform its functions (e.g., programmed instructions). For example, memory 410 can include any suitable computer-readable storage media, described below, depending on whether, for example, data access needs to be bi-directional or uni-directional. For example, processor 402 can also directly and very rapidly retrieve and store frequently needed data in a cache memory (not shown). The memory can be a non-transitory computer-readable storage medium.

A removable mass storage device 412 provides additional data storage capacity for the computer system 400, and is coupled either bi-directionally (read/write) or uni-directionally (read only) to processor 402. For example, storage 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of mass storage 420 is a hard disk drive. Mass storage device 412 and fixed mass storage 420 generally store additional programming instructions, data, and the like that typically are not in active use by the processor 402. It will be appreciated that the information retained within mass storage device 412 and fixed mass storage 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer instructions. These computer program instructions can be provided to general-purpose computers, special-purpose computers, embedded processors, or processors of other data-processing devices to give rise to a machine such that the instructions by the computers or by the processors of other programmable data-processing devices give rise to devices used to implement the functions specified in one or more processes in a flowchart and/or in one or more blocks in a block diagram.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining, by one or more processors, current driving information, historical driving information, or both, wherein the current driving information, historical driving information, or both are obtained from one or more of a network-side server and a control system of a vehicle;
   determining, by the one or more processors, display information based at least in part on the current driving information, the historical driving information, or both, wherein the determining the display information comprises:
      determining one or more of content to be provided with respect to the electronic map and one or more characteristics pertaining to a manner in which the electronic map is to be provided, based at least in part on one or more of:
         a current driving speed and a mapping of a type of electronic map content to driving speeds;
         a current driving speed and a mapping of one or more characteristics of for providing an electronic map to driving speeds; and
         a current position and a mapping of one or more characteristics of the manner of providing an electronic map to distances; and
   providing, by the one or more processors, an electronic map based at least in part on the display information.

2. The method of claim 1, wherein the display information comprises one or more of electronic map display content and electronic display effects.

3. The method of claim 1, wherein the current driving information comprises one or more of:
   current time;
   current environment information;
   the current position;
   the current driving speed;
   information relating to a current driving control operation;
   current driving route; and/or
   current driving direction.

4. The method of claim 3, wherein the driving control operation comprises one or more of:
   a gearshift control operation; and
   a steering control operation.

5. The method of claim 1, wherein the historical driving information comprises one or more of:
   a previously set target address;
   a previously set position information;
   historical travel tracks, the historical travel tracks comprising one or more of a driving route and a driving time;
   a previously set target point of interest (POI) information;
   a previously visited destination; and/or
   an Internet transaction system-based transaction information.

6. The method of claim 1, wherein determining the display information based at least in part on the one or more of the current driving information and the historical driving information comprises:
   determining one or more of: a category, a level, and/or a quantity of content to be displayed on the electronic map.

7. The method of claim 6, wherein the driving information comprises electronic map display content comprising one or more of:
   a function button on an electronic map interface;
   road information;
   a point of interest (POI);
   lane information; and/or
   driving alert information.

8. The method of claim 1, wherein the determining the display information based at least in part on the one or more of the current driving information and the historical driving information comprises determining an electronic map display effect comprising:
   determining one or any combination of:
      a map scale;
      a line thickness for marking a route;
      a color for marking the route;
      a size of a point of interest (POI) size;
      a color of the POI; and
      a three-dimensional display effect.

9. The method of claim 1, wherein the determining the one or more of content to be provided with respect to the electronic map and one or more characteristics pertaining to the manner in which the electronic map is to be provided comprises: determining current electronic map display content based on the current driving speed and one or more of a category, a quantity, and a level of the electronic map display content corresponding to preset driving speeds.

10. The method of claim 1, wherein the determining the one or more of content to be provided with respect to the electronic map and one or more characteristics pertaining to the manner in which the electronic map is to be provided comprises: determining a current electronic map scale based on the current driving speed and electronic map scales corresponding to preset driving speeds.

11. The method of claim 1, the determining the one or more of content to be provided with respect to the electronic map and one or more characteristics pertaining to the manner in which the electronic map is to be provided comprises: determining electronic map display effects of display content on a current electronic map based on the current position and preset display effects of display content for different distance ranges relative to the current position.

12. The method of claim 1, wherein the determining the display information based at least in part on the one or more of the current driving information and the historical driving information comprises: marking a turning icon corresponding to lane information on a current road on the electronic map based on a current turn signal operation.

13. The method of claim 1, wherein the determining the display information based at least in part on the one or more of the current driving information and the historical driving information comprises:
   determining whether a current parked position is legal; and one or more of:
  providing an indication of whether the current parked position is legal on the electronic map; and
  providing an indication of a parking lot within a predefined threshold distance of a current position of the vehicle on the electronic map in response to determining that a current status of the vehicle corresponds to a parked status, the determining the current status being based on a current gearshift operation.

14. The method of claim 1, wherein the determining the display information based at least in part on the one or more of the current driving information and the historical driving information comprises:
  determining a currently driven road and one or more points of interest (POIs) along the currently driven road that are included in electronic map display content based at least in part on at least one of the one or more of the current driving information and the historical driving information; and
  determining one or more electronic map display effects, comprising:
    determining to display at least one of the one or more POIs along the currently driven road with greater prominence than POIs along other roads; or
    determining to display at least one of the one or more POIs to have a size or brightness based at least in part on a driving speed, a changing position, and a distance between the at least one POI and a current position.

15. The method of claim 1, further comprising:
  after obtaining, by the one or more processors, one or more of the current driving information and the historical driving information, obtaining anticipated driving route information, wherein the anticipated driving route information is determined based on one or more of the current driving information and the historical driving information,
  wherein the determining the display information based at least in part on the one or more of the current driving information and the historical driving information comprises: determining one or more of an electronic map display content and an electronic map display effects based at least in part on the one or more of current driving information and historical driving information and the anticipated driving route information.

16. The method of claim 15, wherein the anticipated driving route information is determined by a terminal associated with the vehicle in connection with which the electronic map is provided.

17. The method of claim 15, wherein the anticipated driving route information is determined by the network-side server that provides the anticipated driving route information to a terminal associated with the vehicle in connection with which the electronic map is provided.

18. The method of claim 15 wherein the determining of the one or more of the electronic map display content and the electronic map display effects based at least in part on the one or more of the current driving information and the historical driving information and the anticipated driving route information comprises:
  determining to display on the electronic map an anticipated next road, and signs of the anticipated next road along the route based on the current driving information and an anticipated driving route corresponding to the anticipated driving route information; and
  determining one or more electronic map display effects, comprising:
    the currently driven road being displayed with greater prominence than the anticipated next road; and
    road signs along the currently driven road being displayed in a simulated reality form based on a current driving speed in a manner such that the road signs along the currently driven road appear gradually as the road signs are approached and such that the road signs along the currently driven road vanish gradually as the road signs become more distant in relation to a current location of the vehicle.

19. The method of claim 1, further comprising:
  switching the electronic map to a driving mode if a terminal does not receive an operating instruction directed at the electronic map within a set length of time.

20. A device, comprising:
  one or more processors configured to:
    obtain current driving information, historical driving information, or both, wherein the current driving information, historical driving information, or both are obtained from one or more of a network-side server and a control system of a vehicle;
    determine display information based at least in part on the current driving information, the historical driving information, or both, wherein to determine the display information comprises:
      determining one or more of content to be provided with respect to the electronic map and one or more characteristics pertaining to a manner in which the electronic map is to be provided, based at least in part on one or more of:
        a current driving speed and a mapping of a type of electronic map content to driving speeds;
        a current driving speed and a mapping of one or more characteristics of for providing an electronic map to driving speeds; and
        a current position and a mapping of one or more characteristics of the manner of providing an electronic map to distances; and
    provide an electronic map based at least in part on the display information; and
  one or more memories coupled to the one or more processors, configured to provide the one or more processors with instructions.

21. A computer program product, the computer program product being embodied in a non-transitory computer readable storage medium and comprising computer instructions for:
  obtaining, by one or more processors, current driving information, historical driving information, or both, wherein the current driving information, historical driving information, or both are obtained from one or more of a network-side server and a control system of a vehicle;
  determining, by the one or more processors, display information based at least in part on the current driving information, the historical driving information, or both, wherein the determining the display information comprises:
    determining one or more of content to be provided with respect to the electronic map and one or more characteristics pertaining to a manner in which the electronic map is to be provided, based at least in part on one or more of:

a current driving speed and a mapping of a type of electronic map content to driving speeds;
a current driving speed and a mapping of one or more characteristics of for providing an electronic map to driving speeds; and
a current position and a mapping of one or more characteristics of the manner of providing an electronic map to distances; and
providing, by the one or more processors, an electronic map based at least in part on the display information.

22. A method, comprising:
obtaining, by one or more processors, current driving information, historical driving information, or both, wherein the current driving information, historical driving information, or both are obtained from one or more of a network-side server and a control system of a vehicle;
determining, by the one or more processors, display information based at least in part on the current driving information, the historical driving information, or both, wherein the determining the display information comprises:
 determining a currently driven road and one or more points of interest (POIs) along the currently driven road that are included in electronic map display content based at least in part on at least one of the one or more of the current driving information and the historical driving information; and
 determining one or more electronic map display effects, comprising:
  determining to display at least one of the one or more POIs along the currently driven road with greater prominence than POIs along other roads; or
  determining to display at least one of the one or more POIs to have a size or brightness based at least in part on a driving speed, a changing position, and a distance between the at least one POI and a current position; and
providing, by the one or more processors, an electronic map based at least in part on the display information.

23. A method, comprising:
obtaining, by one or more processors, current driving information, historical driving information, or both, wherein the current driving information, historical driving information, or both are obtained from one or more of a network-side server and a control system of a vehicle;
after obtaining, by the one or more processors, one or more of the current driving information and the historical driving information, obtaining anticipated driving route information, wherein the anticipated driving route information is determined based on one or more of the current driving information and the historical driving information;
determining, by the one or more processors, display information based at least in part on the current driving information, the historical driving information, or both, wherein the determining the display information comprises:
 determining one or more of an electronic map display content and an electronic map display effects based at least in part on the one or more of current driving information and historical driving information and the anticipated driving route information; and
providing, by the one or more processors, an electronic map based at least in part on the display information.

* * * * *

UNITED STATES PATENT AND TRADEMARK OFFICE
CERTIFICATE OF CORRECTION

PATENT NO. : 10,809,090 B2  
APPLICATION NO. : 16/004147  
DATED : October 20, 2020  
INVENTOR(S) : Lijuan Cai and Xin Liu Page 1 of 1

It is certified that error appears in the above-identified patent and that said Letters Patent is hereby corrected as shown below:

In the Claims

In Column 35, Line(s) 57, Claim 18, after "claim 15", insert --,--.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*